United States Patent
Lee et al.

(10) Patent No.: US 12,464,270 B2
(45) Date of Patent: Nov. 4, 2025

(54) METHOD AND APPARATUS FOR MANAGING LINE NUMBER SHEET FOR MOBILE COMMUNICATIONS SYSTEM

(71) Applicant: HFR, INC., Seongnam-si (KR)

(72) Inventors: Sun Ik Lee, Yongin-si (KR); Ka Yoon Kim, Seoul (KR); Jin Wook Lee, Seongnam-si (KR); Sang Woo Kim, Yongin-si (KR); Jong Min Lee, Anyang-si (KR); Myung Hun Song, Hwaseong-si (KR); Beum Geun Cho, Hwaseong-si (KR)

(73) Assignee: HFR, Inc., Seongnam-si (KR)

( * ) Notice: Subject to any disclaimer, the term of this patent is extended or adjusted under 35 U.S.C. 154(b) by 347 days.

(21) Appl. No.: 18/038,935

(22) PCT Filed: Nov. 26, 2020

(86) PCT No.: PCT/KR2020/016895
§ 371 (c)(1),
(2) Date: May 25, 2023

(87) PCT Pub. No.: WO2022/114259
PCT Pub. Date: Jun. 2, 2022

(65) Prior Publication Data
US 2024/0098390 A1  Mar. 21, 2024

(30) Foreign Application Priority Data
Nov. 25, 2020 (KR) .................. 10-2020-0160132

(51) Int. Cl.
*H04Q 1/02* (2006.01)
*H04Q 11/00* (2006.01)
*H04W 88/02* (2009.01)

(52) U.S. Cl.
CPC .......... *H04Q 11/0062* (2013.01); *H04Q 2011/0073* (2013.01); *H04Q 2213/13349* (2013.01); *H04Q 2213/295* (2013.01)

(58) Field of Classification Search
CPC ............. H04Q 11/0062; H04Q 5/00; H04Q 2011/0073; H04Q 2213/13349; H04Q 2213/295
(Continued)

(56) References Cited

U.S. PATENT DOCUMENTS

| 11,716,558 | B2 * | 8/2023 | Jayawardene | ........ H04L 5/0037 370/329 |
| 2014/0233591 | A1 * | 8/2014 | Cho | .................... H04J 14/0267 398/79 |
| 2018/0006726 | A1 * | 1/2018 | Kim | ..................... G02B 6/4298 |
| 2019/0245740 | A1 * | 8/2019 | Kachhla | ................ H04L 41/045 |

FOREIGN PATENT DOCUMENTS

| JP | 2014072594 A | 4/2014 |
| KR | 100834705 B1 | 6/2008 |

(Continued)

OTHER PUBLICATIONS

IP.com search history (Year: 2025).*
(Continued)

*Primary Examiner* — Moustapha Diaby
(74) *Attorney, Agent, or Firm* — Harness, Dickey & Pierce, P.L.C.

(57) ABSTRACT

The present disclosure provides a mobile communications system line number sheet management device and method. Provided, according to one aspect of the present disclosure, is a line number sheet management device and method, for automating access network-related line number sheet management by automatically collecting and updating line number information, the line number information being collected from a mobile communications base station management server (mobile communications system management server) and a fronthaul management server. Provided, according to another aspect of the present disclosure, is a fronthaul device for: acquiring unique information of a base station by receiving an optical signal from any one of a radio unit (RU) and a digital unit (DU); and transmitting the unique information of the base station to a fronthaul management server.

14 Claims, 5 Drawing Sheets

(58) Field of Classification Search
USPC .................................................... 455/550.1
See application file for complete search history.

(56) References Cited

FOREIGN PATENT DOCUMENTS

| KR | 20140110317 A | 9/2014 |
|----|---------------|--------|
| KR | 101520395 B1  | 5/2015 |
| KR | 102158867 B1  | 9/2020 |

OTHER PUBLICATIONS

Japanese Office Action for Japanese Patent Application No. 2023-532164 dated May 14, 2024 (with English translation) (6 pages).
R3-171832 "F1 interface Further consideration on M-plane aspects" TSG-RAN Working Group 3 meeting #96, Hangzhou, China, May 15-19, 2017 (5 pages).
International Search Report (English and Korean) and Written Opinion of the ISA (English and Korean) issued in PCT/KR2020/016895, mailed Dec. 2, 2021; ISA/KR.

* cited by examiner

METHOD AND APPARATUS FOR MANAGING LINE NUMBER SHEET FOR MOBILE COMMUNICATIONS SYSTEM

CROSS-REFERENCE TO RELATED APPLICATIONS

This application is a U.S. National Phase Application under 35 U.S.C. 371 of International Application No. PCT/KR2020/016895, filed on Nov. 26, 2020, which claims the benefit of Korean Patent Application No. 10-2020-0160132, filed on Nov. 25, 2020. The entire disclosures of the above applications are incorporated herein by reference.

TECHNICAL FIELD

The present disclosure relates to a line number sheet management device and a line number sheet management method for a mobile communication system. The present disclosure is derived from research conducted as part of a broadcasting and communication industry technology development project of the Ministry of Science and ICT [Task identification number: 1711116811, task title: Development of commercial 5G transmission equipment supporting 28 GHz].

BACKGROUND ART

The contents described in this part merely provide background information on the present embodiment and do not constitute prior art.

In a mobile communication system, an access network line number sheet is a sheet for allocating and managing a number to a line used to provide a mobile communication service, and is the source of the line, and refers to a sheet for managing a line use history for a route connected between a source port and a destination port of the line. Here, the source port is a Digital Unit (DU) port of a mobile communication base station, the path means a line of Wavelength Division Multiplexing (WDM) provided by fronthaul, and the destination port means a Radio Unit (RU) of a mobile communication base station.

With development of a mobile communication system and increase in the number of mobile communication service subscribers, line construction of an access network is increasing, but a line number and a line usage history, that is, line number sheet information, are made by manual work of an operator. For example, a field operator directly checks the line number or the like, collects the line usage history, and manages the line usage history in the form of a general sheet such as an Excel file. The line number sheet management dependent on the manual operation of the operator not only makes it difficult to systematically manage the line number sheet, but also has problems such as twisting of line numbers due to human error.

For example, when inquiring or modifying line number sheet information, rather than inquiring and modifying one sheet, each operator uses sheets copied or changed. Accordingly, it is impossible to check the last modified sheet and it is difficult to manage the line.

DISCLOSURE

Technical Problem

According to one aspect of the present disclosure, a main object thereof is to provide a line number sheet management device and a line number sheet management method for automating a line number sheet management related to an access network by automatically collecting and updating line number information from a mobile communication base station management server and a fronthaul management server.

According to another aspect of the present disclosure, another main object thereof is to provide a line number sheet management automation device and a line number sheet management automation method for collecting and updating access network line number sheet information in real time and unifying line number sheet management inquiry.

According to still another aspect of the present disclosure, still another main object thereof is to provide a fronthaul device for acquiring base station unique information by receiving an optical signal from any one of a Radio Unit (RU) and a Digital Unit (DU) and transmitting base station unique information from a fronthaul management server.

Technical Solution

An embodiment of the present disclosure provides a line number sheet management device comprising: a base station information acquisition unit configured to acquire base station line number information including base station unique information of a mobile communication base station from a mobile communication base station management server managing one or more mobile communication base stations; a fronthaul information acquisition unit configured to acquire fronthaul line number information including base station unique information acquired by a fronthaul device from a fronthaul management server managing one or more fronthaul devices; and a line number sheet management unit configured to generate or change a line number sheet based on the base station line number information and the fronthaul line number information.

Another embodiment of the present disclosure provides a line number sheet management method comprising: acquiring base station line number information including base station unique information of a mobile communication base station from a mobile communication base station management server managing one or more mobile communication base stations; acquiring fronthaul line number information including base station unique information acquired by a fronthaul device from a fronthaul management server managing one or more fronthaul devices; and generating or changing a line number sheet based on the base station line number information and the fronthaul line number information.

Yet another embodiment of the present disclosure provides the line number sheet management device or method as mentioned above, wherein the generating or changing of the line number sheet includes, when the base station unique information of the mobile communication base station and the base station unique information acquired by the fronthaul device match, generating or changing the line number sheet to include complete line number information including all or part of the base station line number information and all or part of the fronthaul line number information.

Yet another embodiment of the present disclosure provides the line number sheet management device as mentioned above, further comprising a database configured to store a generated or changed line number sheet and/or a user interface configured to inquire the generated or changed line number sheet.

Yet another embodiment of the present disclosure provides a fronthaul device receiving an optical signal from a mobile communication base station that is any one of a Radio Unit (RU) and a Digital Unit (DU), the fronthaul device comprising: a unique information acquisition unit configured to acquire base station unique information from the optical signal using a preset interface; an allocation unit configured to allocate a line to transmit the optical signal; and a line number sheet management unit configured to transmit the base station unique information and information on the allocated line to the fronthaul management server.

Advantageous Effects

According to a line number sheet management device and a line number sheet management method of an aspect of the present disclosure, by generating or updating line number sheet management by acquiring line number information from a mobile communication base station management server and a fronthaul management server, line number sheet management is automated and systematic line management is possible.

According to a line number sheet management device and line number sheet management method of another aspect of the present disclosure, by storing and managing a generated or updated line number sheet in a database and providing the generated or updated line number sheet to a user using a user interface, line number sheet management inquiry is unified so that a user can request the most up-to-date line number sheet information, and the line management is easy.

Therefore, when using the line number sheet management device and the line number sheet management method according to various aspects of the present disclosure, it is possible to inquire the most up-to-date line number sheet information and immediately cope with problems of the line, thereby maintaining and improving quality of mobile communication service.

In addition, according to a fronthaul device of one aspect of the present disclosure, by acquiring base station unique information by receiving an optical signal from a mobile communication base station, and transmitting base station unique information to the fronthaul management server, the line number sheet management device can automatically manage the line number sheet.

MODE FOR DISCLOSURE

The present disclosure relates to a line number sheet management device, method, and system for automatically managing and using a line number sheet by systematizing a management method of the line number sheet related to an access network.

The line number sheet related to the access network of the present disclosure means an electronic document configured to generate, change, inquire, share, or delete information on use of a line which has one or more lines (for example, optical cable or the like) of a fronthaul device, which has any one of a Radio Unit (RU) and a Digital Unit (DU) which are mobile communication base station as a source port and the other thereof as a destination port and supports connection between the RU and the DU, as a track.

Figure 1:
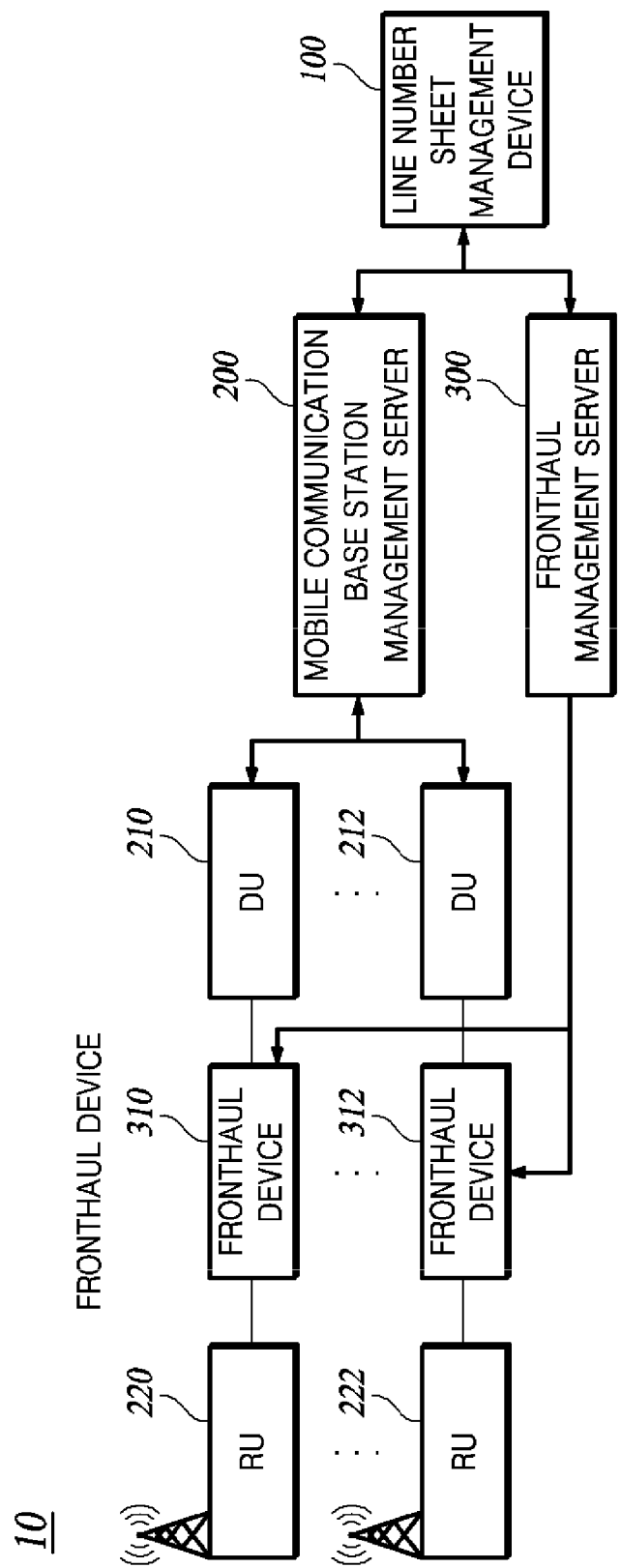
FIG. 1 is a conceptual diagram illustrating a line number sheet management system according to one embodiment of the present disclosure.

FIG. 1 is a conceptual diagram illustrating a line number sheet management system according to one embodiment of the present disclosure.

The line number sheet management system 10 can be divided into a mobile communication system area which includes mobile communication base stations 210, 212, 220, and 222 divided into DUs 210 and 212 and RUs 220 and 222 and a base station management server 200, a fronthaul area which includes fronthaul devices 310 and 312 constituting an access network connecting the DUs 210 and 212 and the RUs 220 and 222 and a fronthaul management server 300, and a line number sheet management area which includes a line number sheet management device 100 which acquires base station line number information and fronthaul line number information from the mobile communication base station management server 200 and the fronthaul management server 300 to generate or change the line number sheet.

The line number sheet management device 100 may receive or inquire base station unique information that can specify the DUs 210 and 212 and the RUs 220 and 222 as one of the base station line number information from the mobile communication base station management server 200, receive or inquire the base station unique information acquired by the fronthaul devices 310 and 312 from the fronthaul management server 300 to match or combine the received base station unique information, and thus, generate complete line number information.

The mobile communication base station management server 200 collects the base station line number information on the mobile communication base stations 210, 212, 220, and 222. The base station line number information is information required to distinguish the RUs 220 and 222 and the DUs 210 and 212, which are source ports and destination ports, and to connect between the DUs 210 and 212 and the RUs 220 and 222, and includes base station unique information that can distinguish the base station. Here, the base station unique information may be information which includes all or some of a Media Access Control address, a base station name of the mobile communication base station, a base station ID of the mobile communication base station, a preset tag, and a RU serial number (Radio Unit serial number) when the mobile communication base station is the RU. In addition, base station line number information may include a base station ID, a base station name, a DU name, a RU name, distance information between the DU and RU, and the like.

The fronthaul management server 300 collects fronthaul line number information related to each of the fronthaul devices 310 and 312. The fronthaul line number information includes the base station unique information acquired by each of the fronthaul devices 310 and 312 to provide an access network to the mobile communication base station. In addition, fronthaul line number information includes a fronthaul device ID, a fronthaul device name, a unit name of Wavelength Division Multiplexing (WDM) provided by the fronthaul device, a unit slot, a port name of a line of line provided using WDM, a port number, a used wavelength of a line, a wavelength number of the used wavelength, and an ID of a distribution frame used by the line. A method for the fronthaul devices 310 and 312 to acquire the fronthaul line number information will be described later in detail with reference to FIG. 3.

Figure 2:
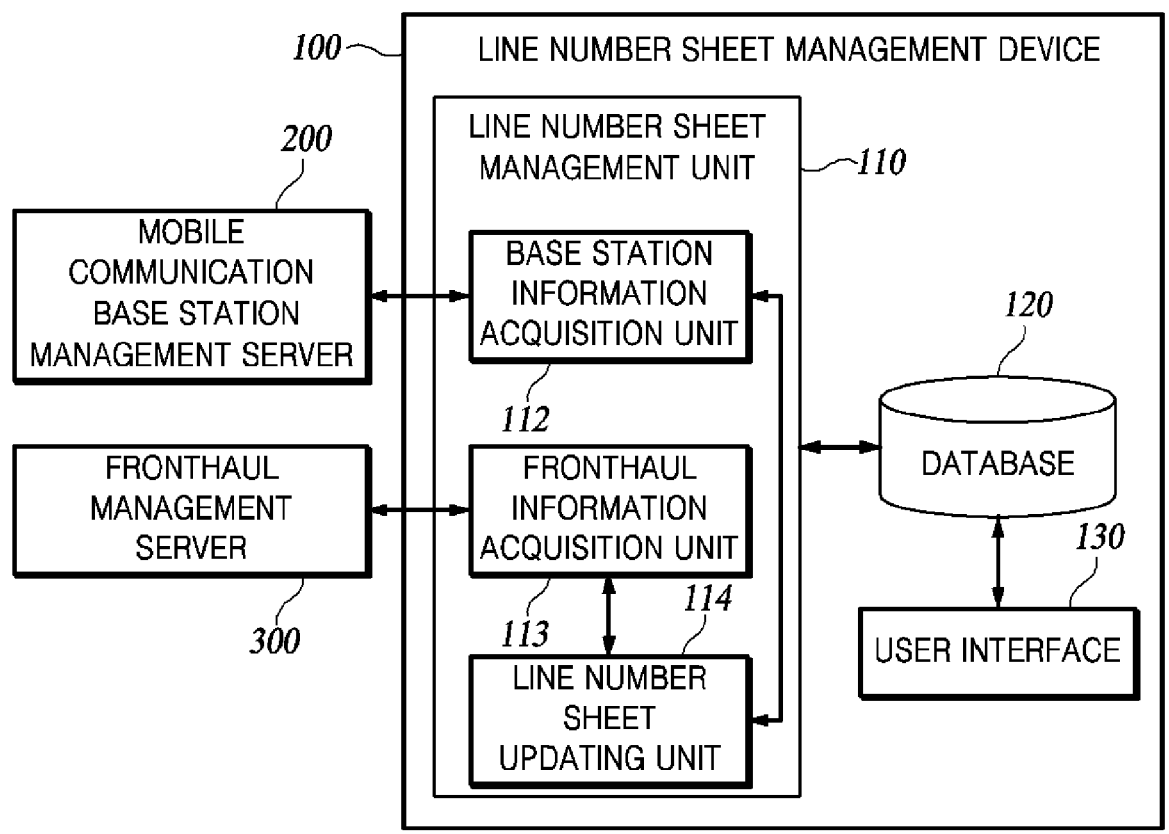
FIG. 2 is a block diagram illustrating a line number sheet management device according to one embodiment of the present disclosure.

FIG. 2 is a block diagram illustrating a line number sheet management device according to one embodiment of the present disclosure.

The line number sheet management device 100 according to one embodiment of the present disclosure includes all or some of a line number sheet management unit 110, a database 120, and a user interface 130. The line number sheet management device 100 illustrated in FIG. 2 is according to one embodiment of the present disclosure, and all components illustrated in FIG. 2 are not essential components, and some components may be added, changed, or deleted in other embodiments.

FIG. 2 illustrates the line number sheet management device 100 as a device for convenience of description, but this is for convenience of description, and in another embodiment, the line number sheet management device may be implemented by a software module or processor that performs functions of the components 110 to 130.

The line number sheet management unit 110 may include all or some of a base station information acquisition unit 112 which receives or inquires base station line number information including base station unique information capable of specifying a base station from the mobile communication base station management server 200, a fronthaul information acquisition unit 113 which receives or inquires fronthaul line number information including the base station unique information acquired by the fronthaul device from the fronthaul management server 300, and a line number sheet updating unit 114 which generates or changes the line number sheet based on the base station line number information and fronthaul line number information, but not all components illustrated in FIG. 2 are essential components, and some components may be added, changed, or deleted in other embodiments. For example, in another embodiment, the line number sheet management device may further include a calibration unit (not illustrated) capable of correcting an error by comparing each line number information.

The base station information acquisition unit 112 receives or inquires the base station line number information including the base station unique information from the mobile communication base station management server 200 which collects, stores, and manages information related to establishing a connection between the base stations, such as the base station unique information or a source of original information.

The fronthaul information acquisition unit 113 receives or inquires the fronthaul line number information including unique information about the source port and the destination port from the fronthaul management server 300 which collects, stores, and manages information included to construct the line number information of the line number sheet. Preferably, this fronthaul line number information further includes various physical information (for example, port number, unit slot, or the like) which can identify each line and manage the status of each line, such as the ID of a distribution box through which one or more lines used for connection between base stations pass, or information on communication quality (for example, line defect rate, presence or absence of errors due to banding, or the like).

The line number sheet updating unit 114 generates or changes the line number sheet to include the complete line number information including all or part of the base station line number information and all or part of the fronthaul line number information. Preferably, the complete line number information includes the base station line number information of the base station that is an RU, base station line number information of a DU base station connected to the RU, and fronthaul line number information of the fronthaul device that supports connection between the RU and the DU. The line number sheet updating unit 114 transfers the complete line number information or the generated line number sheet to the database 120 so that the complete line number information is reflected in the database 120.

When the line number sheet is to be updated, such as a change in the line distributed by the fronthaul devices 310 and 312 or the fronthaul devices 310 and 312 or a change in the connected base station, the line number sheet updating unit 114 may receive change-related information from the base station information acquisition unit 112 or the fronthaul information acquisition unit 113 and change the line number sheet.

The line number sheet updating unit 114 provides the changed line number sheet or the generated line number sheet to the user interface 130 or to the database 120 in real time so that the user can quickly perform maintenance of the line.

The database 120 stores and manages the line number sheet generated or updated by the line number sheet management unit 110. The database 120 may further store and manage the base station line number information received or inquired by the base station information acquisition unit 112 and the fronthaul line number information received or inquired by the fronthaul information acquisition unit 113.

FIG. 2 illustrates that the database 120 is included in the line number sheet management device 100, but it is obvious that the database 120 is separate from the line number sheet management device 100, communicates with the line number sheet management device 100, and thus, can store or manage the line number sheet.

The database 120 may classify, store, and manage line number sheets corresponding to each criterion by region/equipment/line defect occurrence rate/preset event or preset classification.

When a request event of a user occurs, the user interface 130 provides data (that is, details of complete line number information on a specific line or specific base station, or the like) on the line number sheet generated or updated by the line number sheet management unit 110 is provided. In order to provide the data on the latest line number sheet to all users, preferably, the user interface 130 does not directly receive data on the line number sheet from the line number sheet management unit 110, but receives data on the line number sheet from the database 120.

The user interface 130 may request a change in data related to the line number sheet stored in the database 120, for example, the ID of the distribution box, the port number of the line, the base station unique information, and the like, according to the content of the request event.

The user interface 130 may check whether access rights, read rights, and/or write rights exist for the user in order to request inquire or change of data stored in the database 120.

FIG. 2 illustrates that the user interface 130 is included in the line number sheet management device 100, but it is obvious that the user interface 130 is separate from the line number sheet management device 100, communicates with the line number sheet management device 100, and thus, can inquire or require for change in data related to the line number sheet.

Figure 3:
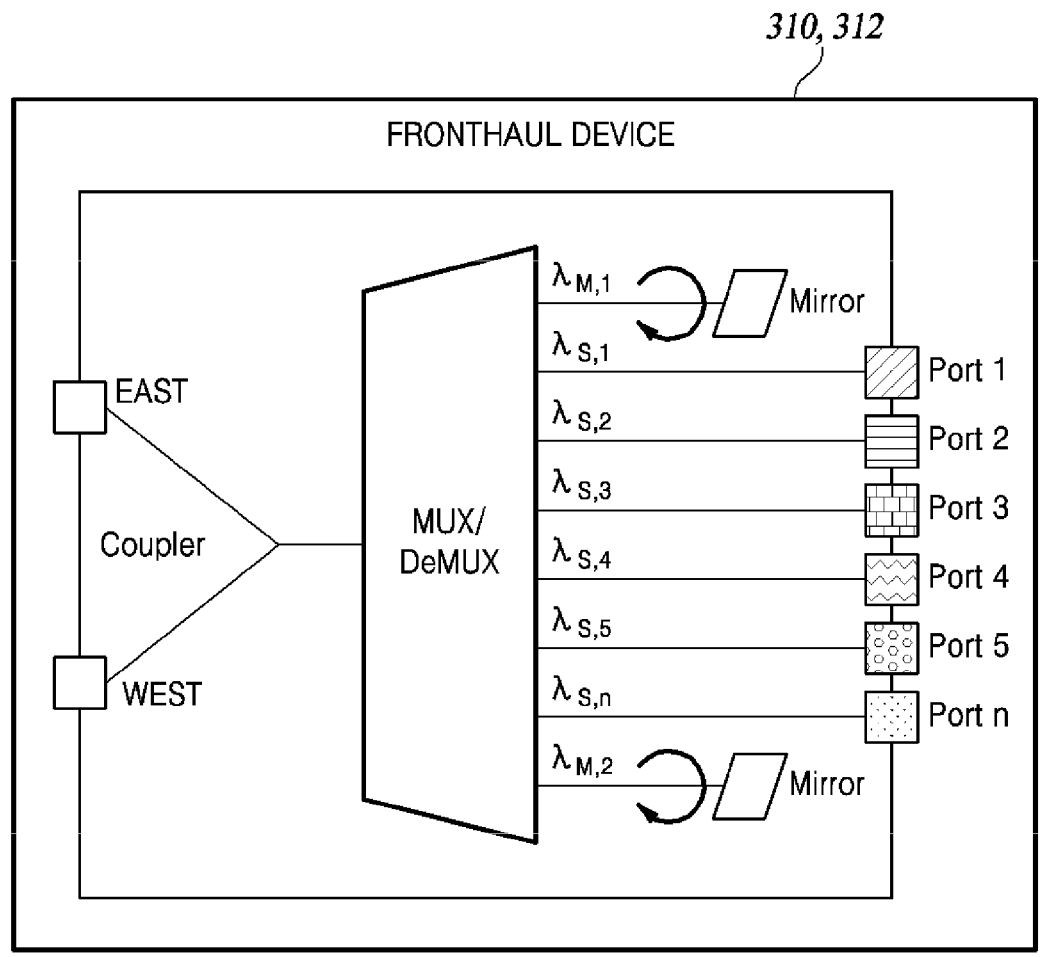
FIG. 3 is a diagram for describing a fronthaul device according to one embodiment of the present disclosure.

FIG. 3 is a diagram for describing the fronthaul device according to one embodiment of the present disclosure.

The fronthaul devices 310 and 312 reconstructs the optical signal converted into a digital signal in units of frames in order to relay the DUs 210 and 212 and the RU 220 and 222 which are the mobile communication base stations. The fronthaul devices 310 and 312 allocate the line to the optical signal reconstructed in frame units and transmits the optical signal allocated with the line to the mobile communication base station of the destination port. The fronthaul devices 310 and 312 may include the base station unique information of each mobile communication base station in a frame and transmit the base station unique information including the frame to the destination port.

The fronthaul devices 310 and 312 acquire the base station unique information from the optical signal based on an interface relaying communication between the DU and RU. For example, when the interface is an enhanced Common Public Radio Interface (eCPRI) or an ethernet interface, the fronthaul devices 310 and 312 acquire the MAC address of each mobile communication base station. When the interface is a Common Public Radio Interface (CPRI), the fronthaul devices 310 and 312 may find a control word from a basic frame, and acquire the base station unique information included in a Control and Management (C&M) channel. When the unique information is included in the form of a tag, the fronthaul devices 310 and 312 may find a base station manufacturer and a pre-negotiated control word, read the tag from a pre-negotiated position in the channel, and thus, acquire the base station unique information.

Referring to FIG. 3, the fronthaul devices 310 and 312 may use a multiplexer (MUX) and/or a demultiplexer (DeMUX), and replay communication between the mobile communication bases stations without configuring a separate channel for each input optical signal or digital signal. For example, when the fronthaul devices 310 and 312 use the WDM method of FIG. 3, signals of various wavelengths can be simultaneously transmitted and received using frequency characteristics of optical signals. The fronthaul devices 310 and 312 may combine and transmit signals of various wavelengths using a multiplexer, and divide and receive optical signals in which signals of multiple wavelengths are combined using a demultiplexer.

The fronthaul devices 310 and 312 may transmit all or some of is a fronthaul device ID, a fronthaul device name, a WDM unit name provided by the fronthaul device, a unit slot, a port name of a line provided using WDM, a port number, a used wavelength of the line (that is, wavelength spacing, band, or the like), a wavelength number of the used wavelength, and the ID of the distribution frame using the line for a mobile communication base station that relays communication to the fronthaul management server 300 so that fronthaul management server 300 can generate and manage the fronthaul line number information. In addition, the fronthaul devices 310 and 312 may further transmit a transmission/reception time of the optical signal, a waypoint, a section distance, a type of transmission equipment, a transmission speed, a transport hierarchy, or the like to the fronthaul management server 300 so that the fronthaul management server 300 can generate more precise line number information.

Figure 4:
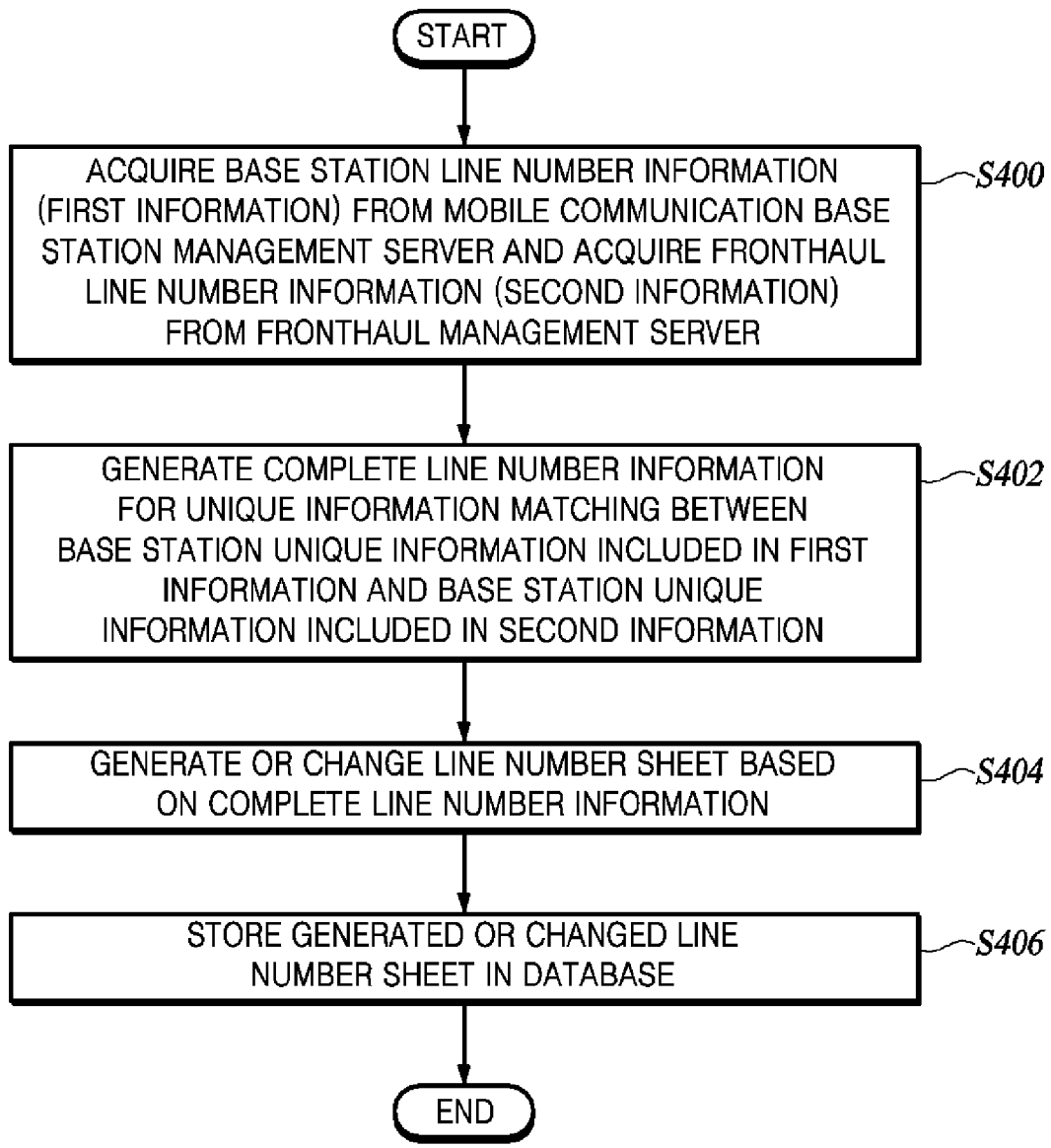
FIG. 4 is a flowchart illustrating a line number sheet management method according to one embodiment of the present disclosure.

FIG. 4 is a flowchart illustrating a line number sheet management method according to one embodiment of the present disclosure.

The line number sheet management device 100 acquires the base station line number information (first information) from the mobile communication base station management server 200 and acquires fronthaul line number information (second information) from the fronthaul management server (S400).

The complete line number information is generated for unique information matching between the base station unique information included in the first information and the base station unique information included in the second information (S402). This complete line number information includes the base station line number information related to the mobile communication base stations to which the fronthaul devices 310 and 312 providing an access network provide connection, and the fronthaul line number information related to the fronthaul device.

The line number sheet management device 100 generates or changes the line number sheet based on the complete line number information (S404).

The line number sheet is stored in the generated or changed database (S406). At this time, it is preferable to allow the user to inquire only the line number sheet stored in the database so that the user can inquire the most up-to-date line number information.

Figure 5:
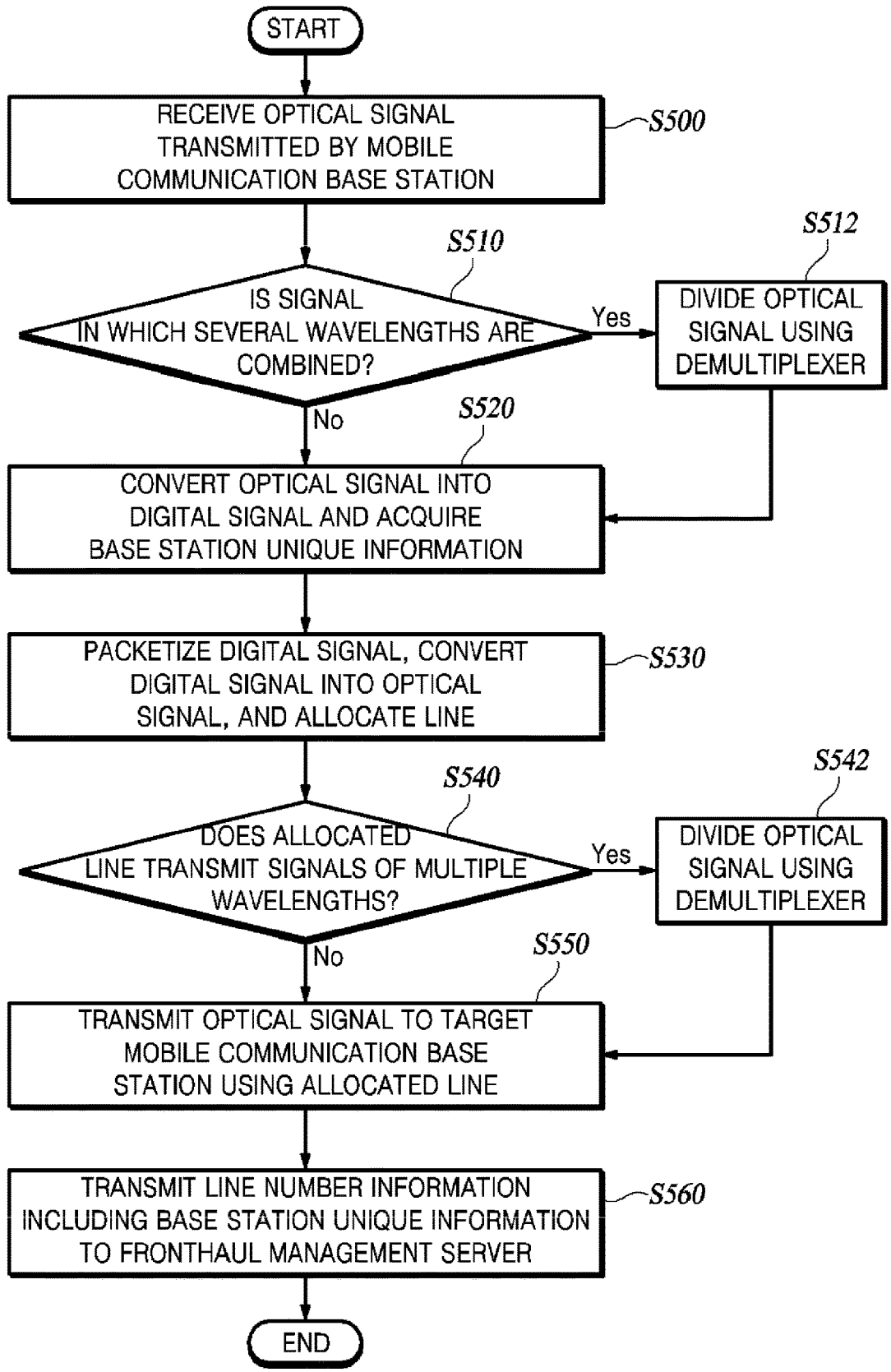
FIG. 5 is a flowchart illustrating a method for a fronthaul device to acquire line number information according to one embodiment of the present disclosure.

FIG. 5 is a flowchart illustrating a method for a fronthaul device to acquire the line number information according to one embodiment of the present disclosure.

The fronthaul devices 310 and 312 receive the optical signal transmitted by the mobile communication base stations 210, 212, 220, and 222 (S500).

It is determined whether the received optical signal is a signal in which several wavelengths are combined (S510), and in a case where the received optical signal is the signal in which several wavelengths are combined, the optical signal is divided according to the wavelength using a demultiplexer (S512). Although the fronthaul devices 310 and 312 may directly determine whether the optical signal is the signal in which multiple wavelengths are combined, it may be determined electronically or mechanically based on the type of optical cable receiving the optical signal, a preset communication interface, and the like. When the fronthaul devices 310 and 312 necessarily include a demultiplexer, Step S510 may be omitted and may be replaced with Step S512.

The received optical signal or the optical signal divided in Step S512 is converted into a digital signal, and the base station unique information is acquired from the digital signal (S520).

The fronthaul devices 310 and 312 packetize the digital signal, convert it into an optical signal, and allocate a line to transmit the optical signal (S530).

It is determined whether the allocated line transmits signals of multiple wavelengths at once (S540), and when signals of multiple wavelengths are transmitted at once, several optical signals to be transmitted are combined using a multiplexer (S542). When the fronthaul devices 310 and 312 necessarily include a multiplexer, Step S540 may be omitted and may be replaced with Step S542.

The converted optical signal or the optical signal combined in Step S542 is transmitted to a target mobile communication base station using the allocated line (S550).

The line number information including the base station unique information is transmitted to the fronthaul management server 300 (S560) so that the fronthaul management server 300 configures the fronthaul line number information.

In FIGS. 4 and 5, it is described that each process is sequentially executed, but this is merely an example of the technical idea of one embodiment of the present disclosure. In other words, those skilled in the art to which one embodiment of the present disclosure belongs may variously modify and change the present disclosure by changing and executing the order described in FIGS. 4 and 5 without departing from the essential characteristics of one embodiment of the present disclosure, or executing one or more of the processes in parallel, and thus, it is not limited to the time-sequential order of FIGS. 4 and 5.

Various implementations of devices, units, processes, steps, and the like described herein may include a digital electronic circuit, an integrated circuit, a field programmable gate array (FPGA), an application specific integrated circuit (ASIC), computer hardware, firmware, software, and/or combinations thereof. These various implementations may include being implemented as one or more computer programs executable on a programmable system. The programmable system includes at least one programmable processor (which may be a special purpose processor or a general-purpose processor) coupled to receive data and instructions from and transmit data and instructions to a storage system, at least one input device, and at least one output device. Computer programs (also known as programs, software, software applications or code) include instructions for a programmable processor and are stored on a "computer readable medium".

The computer-readable recording medium includes all types of recording devices in which data that can be read by a computer system is stored. These computer-readable recording medium may further include a non-volatile or non-transitory medium such as a ROM, a CD-ROM, a magnetic tape, a floppy disk, a memory card, a hard disk, a magneto-optical disk, and a storage device, or a transitory medium such as a data transmission medium. In addition, the computer-readable recording media may be distributed in computer systems connected through a network, and computer-readable codes may be stored and executed in a distributed manner.

Various implementations of the systems and techniques described herein may be implemented by a programmable computer. Here, the computer includes a programmable processor, a data storage system (including volatile memory, non-volatile memory, or other types of storage systems, or combinations thereof) and at least one communication interface. For example, the programmable computer may be one of a server, a network device, a set top box, an embedded device, a computer expansion module, a personal computer, a laptop, a personal data assistant (PDA), a cloud computing system, or a mobile device.

The invention claimed is:

1. A line number sheet management device comprising:
    a base station information acquisition unit configured to acquire base station line number information including base station unique information of a mobile communication base station from a mobile communication base station management server managing one or more mobile communication base stations;
    a fronthaul information acquisition unit configured to acquire fronthaul line number information including base station unique information acquired by a fronthaul device from a fronthaul management server managing one or more fronthaul devices; and
    a line number sheet management unit configured to generate or change a line number sheet based on the base station line number information and the fronthaul line number information.

2. The line number sheet management device of claim 1, wherein when the base station unique information of the mobile communication base station and the base station unique information acquired by the fronthaul device match, the line number sheet management unit generates or changes the line number sheet to include complete line number information including all or part of the base station line number information and all or part of the fronthaul line number information.

3. The line number sheet management device of claim 2, wherein the complete line number information includes line number information of a source port and line number information of a destination port extracted based on the base station line number information, and a line number information on a line provided by the fronthaul device extracted from the fronthaul line number information.

4. The line number sheet management device of claim 1, wherein the mobile communication base station is a Radio Unit (RU) or a Digital Unit (DU), and
    the base station line number information further includes information for distinguishing the RU and the DU and connecting the RU and the DU.

5. The line number sheet management device of claim 1, wherein the base station unique information of the mobile communication base station may be all or some of a Media Access Control address, a base station name of the mobile communication base station, a base station ID of the mobile communication base station, a preset tag, and a serial number of a Radio Unit (RU) when the mobile communication base station is the RU.

6. The line number sheet management device of claim 1, wherein the fronthaul line number information further includes all or some of an ID of the fronthaul device, a name of the fronthaul device, a name of a Wavelength Division Multiplexing (WDM) unit provided by the fronthaul device, a slot of the unit, a port name of the line provided using the WDM, a port number of the line, a used wavelength of the line, a wavelength number of the used wavelength, and an ID of a distribution frame used by the line.

7. The line number sheet management device of claim 1, further comprising a database configured to store a generated or changed line number sheet.

8. The line number sheet management device of claim 1, further comprising a user interface configured to inquire the generated or changed line number sheet.

9. A line number sheet management method comprising:
    acquiring base station line number information including base station unique information of a mobile communication base station from a mobile communication base station management server managing one or more mobile communication base stations;
    acquiring fronthaul line number information including base station unique information acquired by a fronthaul device from a fronthaul management server managing one or more fronthaul devices; and
    generating or changing a line number sheet based on the base station line number information and the fronthaul line number information.

10. The line number sheet management method of claim 9, wherein the generating or changing of the line number sheet includes, when the base station unique information of the mobile communication base station and the base station unique information acquired by the fronthaul device match, generating or changing the line number sheet to include complete line number information including all or part of the base station line number information and all or part of the fronthaul line number information.

11. A fronthaul device receiving an optical signal from a mobile communication base station that is any one of a Radio Unit (RU) and a Digital Unit (DU), the fronthaul device comprising:

a unique information acquisition unit configured to acquire base station unique information from the optical signal using a preset interface;

an allocation unit configured to allocate a line to transmit the optical signal; and a line number sheet management unit configured to transmit the base station unique information and information on the allocated line to the fronthaul management server.

12. The fronthaul device of claim 11, wherein when the interface is an enhanced Common Public Radio Interface (eCPRI) or an Ethernet interface, the unique information acquisition unit acquires a Media Access Control address (MAC address) of the mobile communication base station as the base station unique information from a signal obtained by digitally converting the optical signal.

13. The fronthaul device of claim 11, wherein when the interface is a Common Public Radio Interface (CPRI), the unique information acquisition unit searches for a control word from a basic frame and acquires the base station unique information from a Control and Management (C&M) channel.

14. The fronthaul device of claim 11, wherein when the base station unique information is data in a tag format, the unique information acquisition unit acquires the base station unique information at a pre-negotiated position within a channel by finding a pre-negotiated control word from a digitally converted signal of the optical signal.

* * * * *